(12) United States Patent
Hoge

(10) Patent No.: US 7,481,389 B2
(45) Date of Patent: Jan. 27, 2009

(54) CENTER REEL LOCK STORAGE DEVICE

(75) Inventor: David T. Hoge, Westminster, CO (US)

(73) Assignee: Quantum Corporation, San Jose, CA (US)

( * ) Notice: Subject to any disclaimer, the term of this patent is extended or adjusted under 35 U.S.C. 154(b) by 367 days.

(21) Appl. No.: 11/126,538

(22) Filed: May 10, 2005

(65) Prior Publication Data

US 2006/0255200 A1 Nov. 16, 2006

(51) Int. Cl.
*G11B 23/107* (2006.01)
(52) U.S. Cl. .................... 242/338.1; 242/348
(58) Field of Classification Search ............. 242/338.1, 242/338.3, 343, 343.1, 343.2, 348, 348.1, 242/348.2, 348.3; 360/132
See application file for complete search history.

(56) References Cited

U.S. PATENT DOCUMENTS

| | | | | |
|---|---|---|---|---|
| 3,066,880 | A * | 12/1962 | Bauer ....................... | 242/338.1 |
| 3,677,497 | A * | 7/1972 | Lowry et al. ............. | 242/345.1 |
| 4,341,365 | A * | 7/1982 | Oishi ....................... | 242/338.3 |
| 4,452,407 | A * | 6/1984 | Ogata et al. ................ | 242/336 |
| 4,513,928 | A * | 4/1985 | Hackett ..................... | 242/338.3 |
| 5,436,782 | A * | 7/1995 | Sieben ....................... | 360/132 |
| 5,452,035 | A * | 9/1995 | Watanabe et al. ........... | 395/511 |
| 5,544,834 | A * | 8/1996 | Esguerra et al. .......... | 242/347.1 |
| 5,813,622 | A * | 9/1998 | von Alten .................. | 242/348 |
| 6,038,112 | A * | 3/2000 | Kletzl ....................... | 360/132 |
| 6,318,657 | B1 | 11/2001 | Nayak | |
| 6,667,852 | B2 | 12/2003 | Morita et al. | |
| 6,722,598 | B2 * | 4/2004 | Taki et al. ................... | 242/348 |
| 6,739,537 | B2 * | 5/2004 | Mizutani et al. ......... | 242/332.4 |
| 6,764,038 | B2 * | 7/2004 | Morita et al. ............. | 242/348.2 |
| 7,040,564 | B1 * | 5/2006 | Veno et al. ............... | 242/338.1 |
| 7,350,731 | B2 | 4/2008 | Hiraguchi | |
| 2002/0096590 | A1 * | 7/2002 | Morita et al. ............... | 242/348 |

FOREIGN PATENT DOCUMENTS

EP 1260984 A2 11/2002

OTHER PUBLICATIONS

European Search Report and Search Opinion mailed on May 16, 2008, for Application No. 06252463.2 filed on May 10, 2006, 5 pages.

* cited by examiner

*Primary Examiner*—Peter M Cuomo
*Assistant Examiner*—Scott Haugland
(74) *Attorney, Agent, or Firm*—Morrison & Foerster LLP

(57) ABSTRACT

An apparatus for locking a rotatable portion of a storage device is provided. The apparatus comprises a component irrotatably engaged with the rotatable portion, the component having first teeth for engaging second teeth disposed on a surface irrotatable with respect to the component. A spring is disposed between the component and the reel to urge engagement of the first teeth and the second teeth. The component is slidably engaged with the reel such that by pulling on the component, the component slides with respect to the reel and the first teeth disengage from the second teeth, thereby permitting the reel and the component to rotate. A method for accessing media disposed on the reel includes pushing the reel away from a bottom portion of the storage device, pulling down on the component to disengage the first teeth from the second teeth, and rotating the reel to access the media.

3 Claims, 5 Drawing Sheets

CENTER REEL LOCK STORAGE DEVICE

BACKGROUND

1. Field

The present invention relates to storage devices having a rotatable portion, such as a tape reel, and more particularly to lock systems for securing the rotatable portion.

2. Description of Related Art

Storage devices, such as magnetic tape cartridges, may provide a means for securing a rotatable portion (e.g., a tape reel) of the storage device against unwanted rotation or other movement. Such securing means ought to be releasable so that the rotatable portion can rotate freely when the storage device is accessed for reading and/or writing of data onto media disposed on the rotatable portion. By example, a tape cartridge may have a reel with magnetic tape disposed thereon, and the reel may be secured from rotation when the tape cartridge is stored in a library system, and upon retrieval of the tape cartridge for access in a drive, the reel may be freed for rotation so that the magnetic tape disposed on the reel may be accessed.

With further regard to tape cartridges, conventional art includes a reel that has teeth disposed on a radial edge of the reel (i.e., facing radially from an axis of rotation), and an arm mechanism attached to a housing of the tape cartridge that pivots to engage the teeth of the reel to prevent reel rotation and pivots away from the teeth so that the reel can rotate. Such mechanisms can be complicated and typically provide for a single point of contact between the teeth and the arm. Another locking mechanism is also conventional and provides for a more distributed contact surface between a locking mechanism and a portion of the reel. This locking mechanism in the context of a tape cartridge is illustrated in FIG. 1. This locking mechanism has certain disadvantages as well, which are described herein. Therefore, a demand exists for an improved mechanism to releasably secure a rotatable portion of a storage device.

SUMMARY

Exemplary aspects include a reel lock for a storage device. The reel lock comprises a lock component engaged with a reel to prevent rotation of the lock component relative to the reel. The lock component is operable to releasably engage with a surface irrotatable with respect to the lock component, and to disengage from the irrotatable surface in response to a force.

Another exemplary aspect includes a storage device having an exemplary lock component. The storage device further comprises a reel for holding storage media, and a housing.

A still further exemplary aspect includes a method for releasing an exemplary reel lock. The method comprises moving a reel away from a portion of a housing of the storage device, pulling a lock component irrotatably and slidably engaged with the reel towards the portion. The pulling is for overcoming a force urging first teeth disposed on the lock component to engage with second teeth disposed on a surface irrotatable with respect to the lock component. The reel is then rotated to access the media.

BRIEF DESCRIPTION OF THE DRAWINGS

For describing aspects and examples herein, reference is made to the accompanying drawings in the following description.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of storage devices, including tape cartridges. Center reel locks according to aspects of the invention may be designed and may operate in a number of ways. Exemplary subject matter provided herein is for installing various inventive aspects and is not intended to limit applicability of those aspects to any illustrated device.

Figure 1:
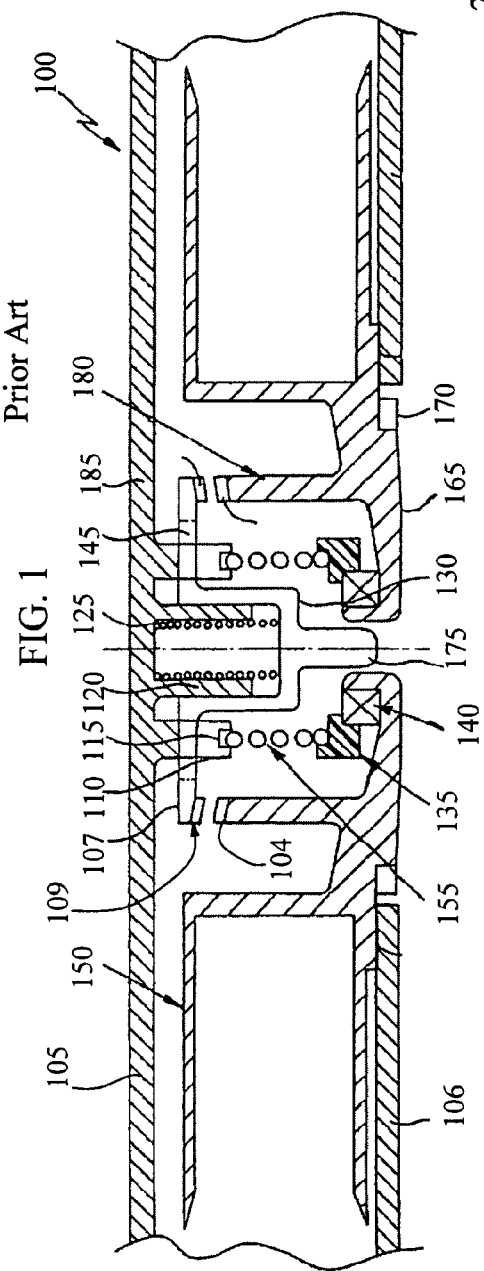
FIG. 1 illustrates a prior art center reel lock for tape cartridges.

FIG. 1 illustrates a prior art cartridge 100 having a center reel locking mechanism. A reel 150 is disposed in a housing having a top portion 105 and a bottom portion 106. A straight boss 120 extends from the top portion 105, and a compression spring 125 is disposed in an inner diameter of the boss 120. A brake element 107 is disposed around an outer diameter of the boss 120, the brake element includes radially extending arms 145, and each of the arms 145 has a toothed portion 109 opposing a toothed portion 104 of reel 150. The brake element 107 is secured from rotation by spokes 110 extending from the top portion 105. A compression spring 155 is disposed between a spring retainer portion 115 of spokes 110 and a spring retainer 135 that is in turn attached to a thrust bearing 140. The brake element 107 further includes a release button 175 disposed in a journal hole of the reel, and accessible by a portion of a drive designed for accessing media disposed on the reel 150.

The reel 150 is disposed in a radial center of the bottom portion 106 of the housing around an access hole (not separately indicated). Reel propulsion teeth 170 disposed circumferentially on a bottom portion of the reel are accessible through the access hole, and provide a means for spinning the reel 150 during access of the media. However, before the reel can be spun, the brake mechanism illustrated must be released. Release is accomplished by pushing on the release button 175 through the journal hole. In conjunction, a drive element will also push on the propulsion teeth 170 to lift reel 150 off of the bottom portion 106. By pushing on the release button 175, the brake element 107 is pushed towards the top portion 105 of the housing, which in turn disengages the toothed portions 109 from the toothed portions 104 of the reel 150.

Notably, continuous pressure must be applied to release button 175 to keep the respective toothed portions of the brake element 107 and the reel 150 from re-engaging, which would cause the reel 150 to again assume a locked position. Also, because brake element 107 is secured from rotation, thrust bearing 140 must be supplied to provide for the relative rotation of the reel 150 and the brake element 107 which interface through compression spring 155. Finally, since brake release 175 is stationary, either a stationary portion of a drive coupling must be provided, or there will be another spinning interface between the brake release 175 and a drive member pushing on the brake release 175 during access of the media in the cartridge 100.

Figure 2:
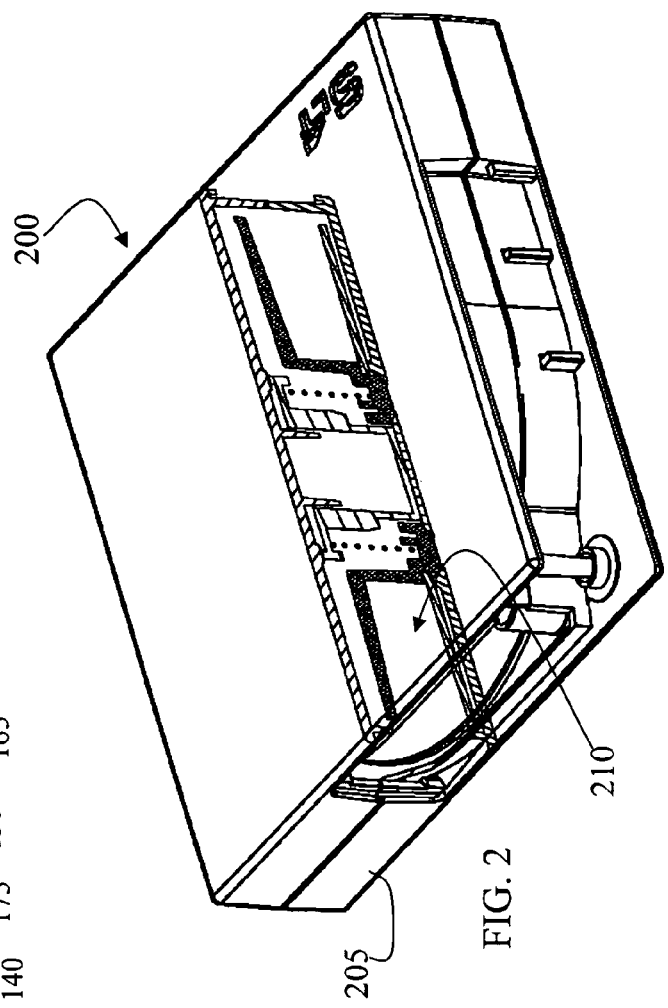
FIG. 2 illustrates a storage device with an identified cross-section for further illustration.

Now turning to FIG. 2, a cross section 210 of a storage device 200 having a housing 205 is illustrated. The storage device 200 may be a tape cartridge of any variety, such as DLT, SDLT, LTO type tape cartridges, or may be any other storage device having one or more rotatable portions to be releasably secured from rotation. Various inventive aspects will be further discussed in various views of the cross-section 210 illustrated in FIGS. 3-9.

Figure 3:
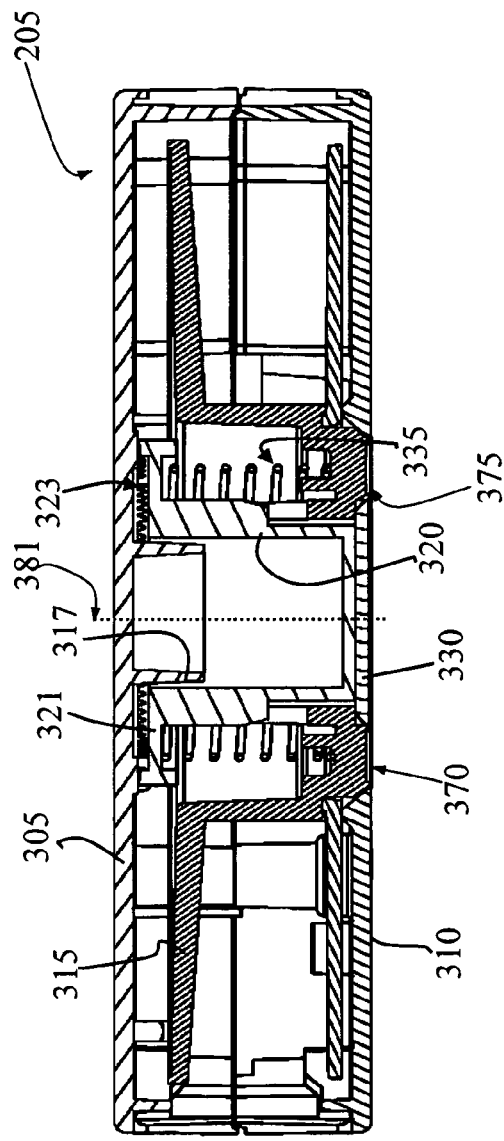
FIG. 3 illustrates the storage device cross-section outside of a drive.

FIG. 3 illustrates cross-section 210 as it would appear when the storage device 200 is not being accessed and may, for example, be stored in an automated storage library. The housing 205 includes a top portion 305 and a bottom portion 310. A tapering boss 317 extends from the top portion 305. An inner diameter of a lock component 320 is disposed around an outer diameter of the tapering boss 317. The lock component 320 extends from proximate the top portion 305 of the housing 205 to proximate the bottom portion 310 of the housing 205. A ferromagnetic washer 330 is coupled to the lock component 320, and is accessible through an access hole 370 (generally indicated) in the bottom portion 310 of housing 205.

Drive coupling teeth 375 formed on a bottom part of a reel 315 are also accessible through access hole 370. The reel 315 is disposed in the housing 205 such that when not in use, the reel 315 rests on an inner surface of the bottom portion 310. Storage media (e.g., magnetic tape) may be disposed on the reel 315. A journal is formed in a central portion of the reel 315, and a portion of the lock component 320 may be disposed in the journal such that the lock component 320 extends from proximate the top portion 305 to proximate the bottom portion 310.

The reel 315 and the lock component 320 are disposed generally coaxially about an intended axis of rotation 381 (generally indicated). In the present example, lock component 320 includes one or more protrusions on an outer surface of the portion of the lock component disposed in the journal of the reel 315. The one or more protrusions are formed to fit within one or more corresponding notches formed in the central portion of the reel 315, the notches may be formed in the journal defined in the central portion of the reel 315.

The relative disposition of the protrusions of the lock component 320 and the corresponding notches of the reel 315 cause the reel 315 and the lock component 320 to be irrotatable with respect to each other. The disposition further provides for the ability of the reel 315 and the lock component 320 to slide with respect to each other generally along the axis of rotation 381, as will be further described herein. In other words, where the reel 315 is being rotated for accessing the media disposed thereon, the lock component 320 rotates with the reel 315. Protrusions may additionally or alternatively be formed in the journal and notches in the outer surface of the lock component. Any combination of protrusions and notches on each of these members may also be formed.

A compression spring 335 is coaxially disposed with the lock component 320 and the reel 315. The compression spring 335 presses on a bottom surface of a disc like portion 321 of the lock component 320 and a top surface of the reel 315. Because reel 315 and lock component 320 may slide relative to each other along the axis of rotation 381, the pressing by the compression spring 335 urges teeth 323 formed on a top surface of the disc like portion 321 of the lock component 320 to engage with teeth formed on an inner surface of the top portion 305 (teeth 605 first separately indicated in FIG. 6) and further urges reel 315 against the inner surface of the bottom portion 310. Thus, when storage device 200 is not in use (by example, not currently in a drive for accessing media disposed on the reel 315), the teeth 323 of the lock component 320 engage with the teeth of the top portion 305 and thereby prevent rotation of the lock component 320, and further because lock component 320 is irrotatable relative to the reel 315, the reel 315 is secured from rotation.

Thus, the configuration of elements illustrated in FIG. 3 provides a center locking mechanism for a reel, wherein the locking mechanism functions without requiring spinning surfaces in contact with one another, by contrast with the locking mechanism illustrated in FIG. 1. Another benefit is that a thrust bearing may no longer be required, which may result in cost savings and may enhance reliability of the storage device 200.

Further aspects of the examplary storage device 200 are now illustrated and described with respect to FIGS. 4-9.

Figure 4:
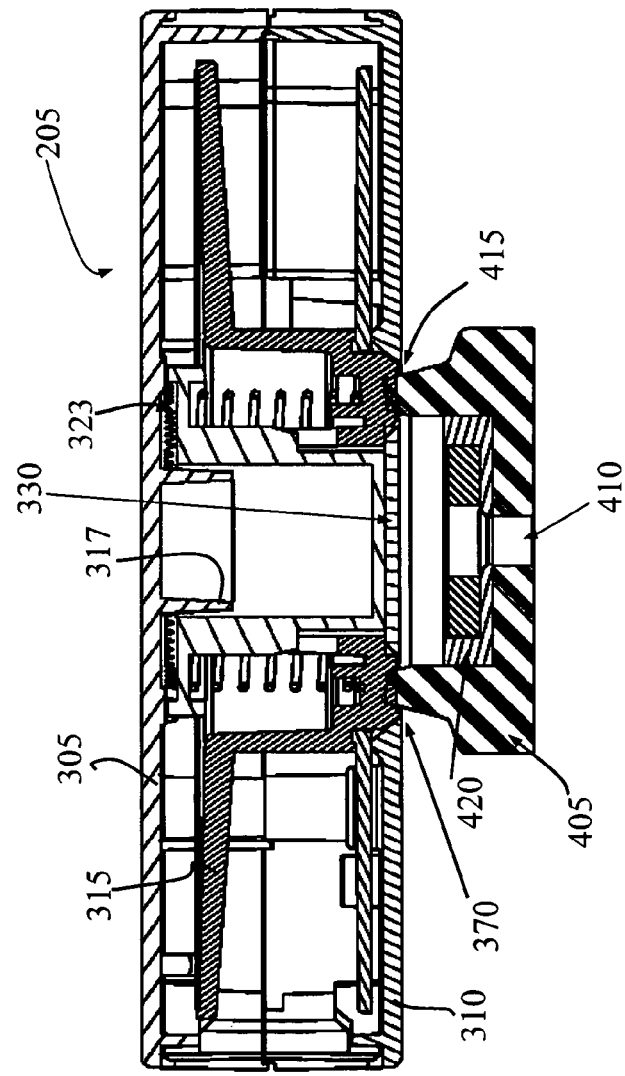
FIG. 4 illustrates a drive coupling in place to begin unlocking a reel of the storage device.

In FIG. 4, the storage device 200 is illustrated in cross-section 210 with further addition of a drive coupling 405. The drive coupling 405 includes a shaft 410. The shaft 410 is coupled with a magnet 420 disposed so that when drive coupling 405 is position proximate ferromagnetic washer 330, the magnet 420 and the ferromagnetic washer 330 are attracted to each other. In some aspects, force of magnet 420 may be strong enough to overcome a force of compression spring 335 from some distance, such that lock component 320 is drawn towards magnet 420. In other aspects, magnet 420 may be moved into place to couple with lock component 320 through ferromagnetic washer 330 and then the lock component may be pulled down by retracting the shaft 410.

Magnet 420 may be a permanent magnet or an electromagnet. In still further aspects, shaft 410 may be releasably coupled to lock component 320 in any number of ways other than through magnetic forces, including by providing releasably interlocking physical elements having a variety of designs. Shaft 410 may be adapted to move relative to drive coupling 405 such that after interlocking with the lock component 320, the shaft 410 may retract to pull on the lock component 320. Regardless of the specific design or the particular source of force, in this example by pulling on the lock component 320, the teeth 323 are disengaged from the teeth formed on the top portion 305, which permits rotation of the reel 315.

The drive coupling 405 further includes teeth 415 (generally indicated) disposed along a top surface of the drive coupling 405. The teeth 415 are formed to engage with the drive coupling teeth 375 (FIG. 3) formed on the bottom portion of the reel 315. The engagement of teeth 415 and drive coupling teeth 375 may be used to transmit rotary force to the reel 315. Although mutually engaging teeth are illustrated as a way to transmit rotary force to the reel 315, rotary force may be transmitted to the reel through any of a variety of means.

To summarize certain exemplary inventive aspects, the drive coupling 405 includes teeth 415 for engaging with drive coupling teeth 375 on the bottom surface of the reel 315, the drive coupling, 405 may also be for pushing the reel 315 away from the bottom portion 310 so that the reel 315 may rotate after release of the lock component 320. The lock component 320 is disposed in the journal of the reel 315 and is irrotatable with respect to the reel 315. The compression spring 335 is disposed between the reel 315 and the lock component 320, forcing the reel 315 towards the bottom portion 310 of the housing 205, and forcing the lock component 320 towards the top portion 305, wherein the teeth 323 formed on the lock component 320 engage with the teeth formed on the inner surface of the top portion 305. The drive coupling 405 includes a shaft 410 including a magnet 420 for engaging with the lock component 320, and for pulling the lock component 320 towards the bottom portion 310.

Figure 5:
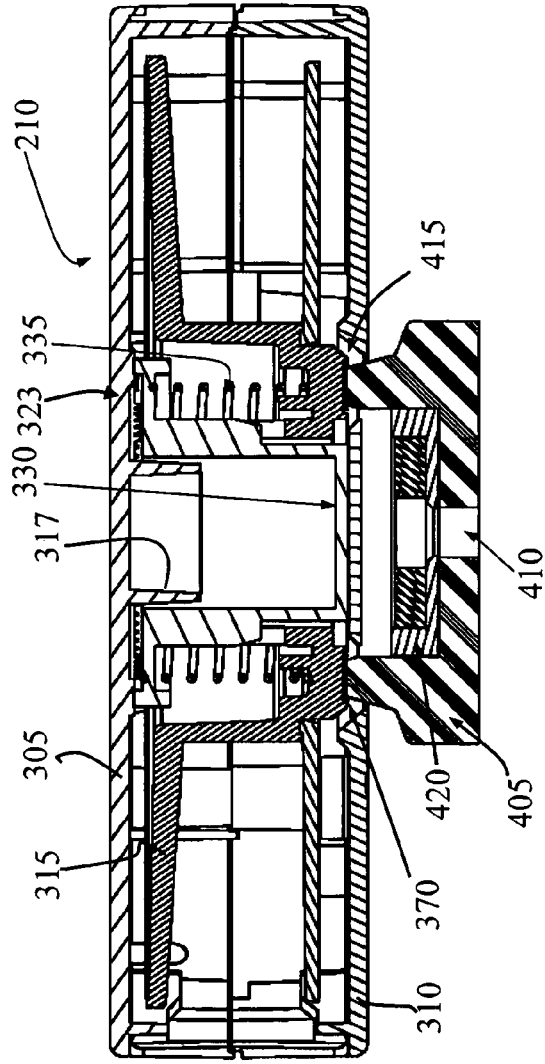
FIG. 5 illustrates the reel lifted from a bottom portion of a housing of the storage device.

FIG. 5 illustrates an intermediate step in the exemplary release of lock component 320. FIG. 5 illustrates that the reel 315 is pushed away from the inner surface of bottom portion 310, but lock component 320 has not yet been pulled away from teeth 323 on top portion 305. Compression spring 335 has been compressed by virtue of the reel 315 moving away from the bottom portion 310 towards top portion 305. Because the reel 315 is now not in contact with bottom portion 310, the reel 315 will be rotatable upon release of lock component 320. In other examples, the lock component 320 may be released before pushing the reel 315 away from the bottom portion 310.

Figure 6:
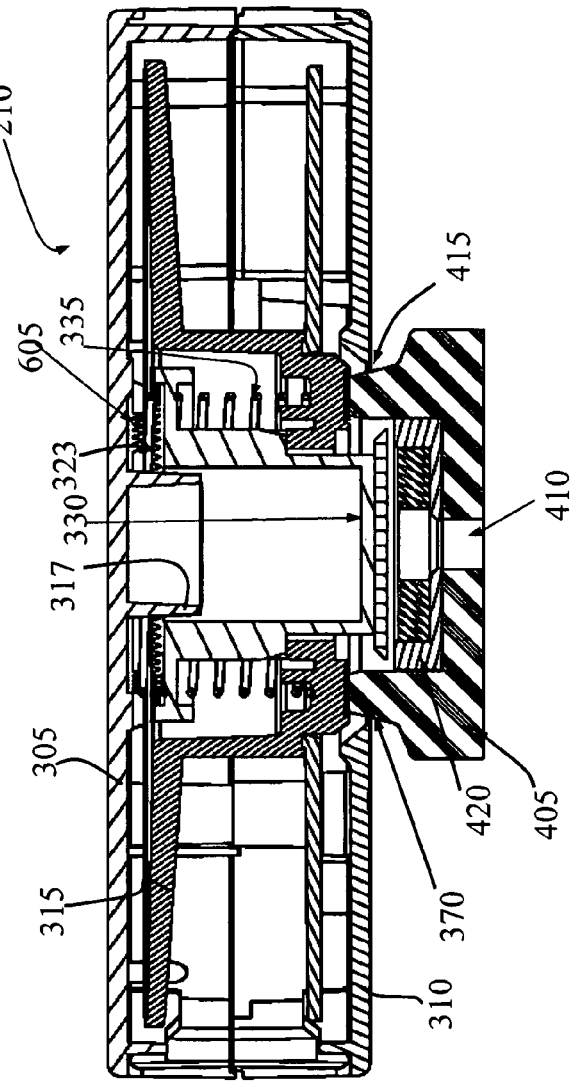
FIG. 6 illustrates the reel and a lock component in an unlocked state.

FIG. 6 illustrates the storage device 200 cross-section 210 with the lock component 320 disengaged from teeth 605 formed at the inner surface of the top portion 305 (general location indicated), which were first discussed with regard to FIG. 3. As discussed above, the disengagement may be accomplished by pulling down on lock component 320 using a variety of means. Since as indicated with respect to FIG. 5, the reel 315 is not in contact with bottom portion 310 and the lock component 320 is now disengaged, the reel may rotate with the reel 315 when the reel 315 is rotated by the drive coupling 405 applying rotational force over the teeth 415 which engage with the drive coupling teeth 375 (see FIG. 3).

An exemplary aspect of storage device 200 that bears further discussion is tapering boss 317. As illustrated with regard to FIG. 3, when lock component 320 is in a locked position (i.e., the teeth 323 of the lock component are engaged with teeth 605 formed on the top portion 305), a wider diameter portion of tapering boss 317 is generally equal to the inner diameter of the lock component 320, such that the tapering boss 317 helps align the lock component 320. When in a locked position, such as illustrated in FIG. 3, the tapering boss 317 also aids in securing the reel 315 from lateral motion. With regard to FIG. 6, when the lock component 320 is disengaged, the lock component 320 is disposed proximate a narrower diameter portion of the tapering boss 317, such that there is some space between the lock component and the tapering boss 317. This space helps allow lock component 320 to rotate without rubbing on or hitting the tapering boss 317.

Another exemplary aspect of storage device 200 is that a hole in the ferromagnetic washer 330 (having an annular shape) may function as a coarse alignment mechanism for drive coupling 405 (and/or shaft 410 with magnet 420). Having this coarse alignment mechanism may aid in more rapidly aligning these elements for accessing media in the storage device 200. This coarse alignment mechanism may also allow less precise positioning mechanisms to be used for the drive coupling 405 and wider tolerances of a variety of other measurements and dimensions. The hole in the ferromagnetic wash 330 may be omitted if desired.

Other designs, arrangements, and dispositions of various components discussed above are contemplated. For example, lock component 320 may be non-circular, or have thicker walls or be solid in one or more portions. The reel 315 may have other shapes conducive to a particular design, and may have a different thickness, different radius, and landing portions that may bias the portions of the reel off the bottom portion 310 of the housing 200. Other ways to exert expansive forces between the lock component 320 and the reel 315 are also contemplated. For example multiple springs may be used. Springs other than compression springs may be used where appropriate.

Also, alterations may be made to provide a variety of ways other than interaction of ferromagnetic washer 330 and magnet 420 to releasably attach drive coupling 405 to lock component 320. For example, various pin and receiver mechanisms may be used. Such mechanisms may provide a hole having a wider and a narrower portion and a pin having a wider head portion sized to the wider portion of the hole. The pin is inserted into the hole and then rotated such that the wider portion of the head is above the narrower portion of the hole, such that when pulling force is applied on the pin the pin does not come out of the hole. To release the pin from the hole, the process may be reversed. The portion of the lock component 320 serving to couple the lock component 320 to the drive coupling 405 may be formed integrally with the lock component 320, or separately.

Similarly, one of ordinary skill in the art would be able to effect further changes to a storage device based on teachings according to exemplary aspects described herein. For example, a lock component 320 may be provided that has a radius similar in size to drive coupling 405, and in such designs, the expansion spring 335 may be disposed in the inner diameter of the lock component 320, the teeth 323 formed on the lock component 320 may be disposed on a radial portion that extends inward rather than outward as illustrated in FIGS. 3-6. Appropriate modifications to the reel 315 may be made to effect such changes.

Separate notches on the reel 315 and protrusions on lock component 320 may be omitted and slidably engagement between the lock component 320 and the reel 315 may instead be provided by extensions of the lock component through the reel 315. Such extensions may attach to the ferromagnetic washer 330, or some other ferromagnetic material in a variety of arrangements. Teeth for engaging the teeth 323 formed on the lock component 320 may be formed on surfaces other than the inner surface of the top portion 305. For example, teeth for engaging the teeth 323 may be formed on a structure coupled to top portion 405, and that structure may wrap under the lock component 320, and in such illustrations, lock component 320 may be released by pushing up on the lock component 320. Appropriate modifications to the reel 315 may be provided to effect appropriate clearances, or other dimensionality considerations, for any such modifications.

In still further aspects, the teeth 323 may be disposed on a surface to face in a direction other than illustrated. For example, the teeth 323 may be disposed on an inner diameter of the lock component 320. Teeth may then be provided at appropriate points on an outer diameter of the tapering boss 317. In such aspects, the tapering boss 317 may be extended or made to taper at a greater angle to properly effect release of the lock component 320 and the reel 315 when the lock component 320 is pulled down. Additionally, the lock component 320 may be moved in some other direction other than being pulled down. Still further aspects may include providing lock component 320 release mechanisms from locations other than locations from which the reel 315 itself is rotated.

All these examples are provided by way of illustration and not limitation; many other variations may be conceived by one of ordinary skill in the art.

Figure 7:
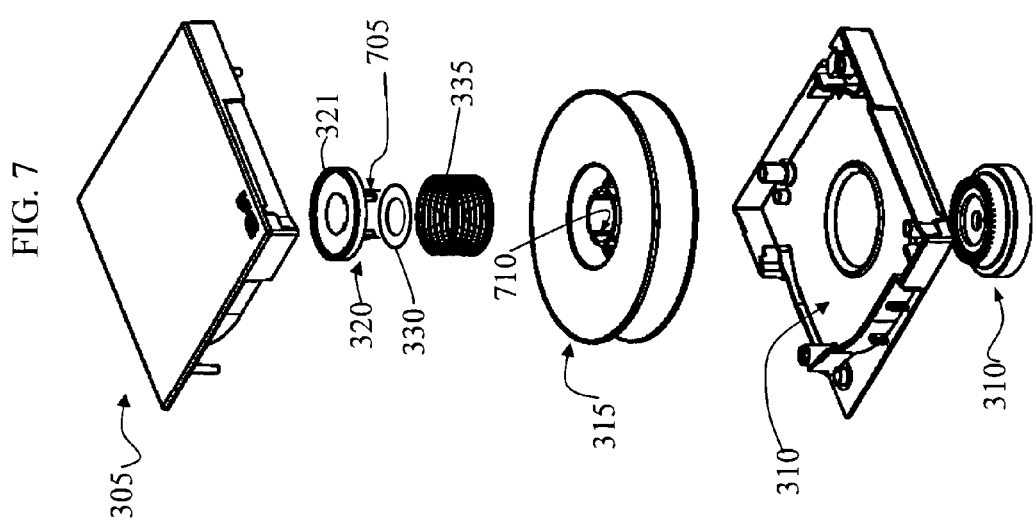
FIG. 7 illustrates an exploded view of the storage device.

FIG. 7 illustrates an exploded view of the storage device 200. The storage device 200 includes the top portion 305, the bottom portion 310, the lock component 320, the compression spring 335, and the reel 315. Protrusions 705 (discussed with respect to FIG. 3) are illustrated on an outer diameter of the lock component 320. In some exemplary aspects, these protrusions slidably engage with-notches 710 formed in an inner diameter (journal portion) of the reel 415. A recessed central portion of the reel 315 is also illustrated, making the reel 315 thinner in the central portion than at a periphery of the reel 315. This thinner central portion may aid retention of compression spring 335 in an appropriate disposition with respect to the reel 315.

Various details of top portion 405 and bottom portion 410 have been illustrated in FIGS. 3-7. These details may be examples of a specific storage device design and may vary amongst different storage devices. Similarly, dimensions both relative and absolute of all parts illustrated herein are for illustration and may not be to scale.

Figure 8:
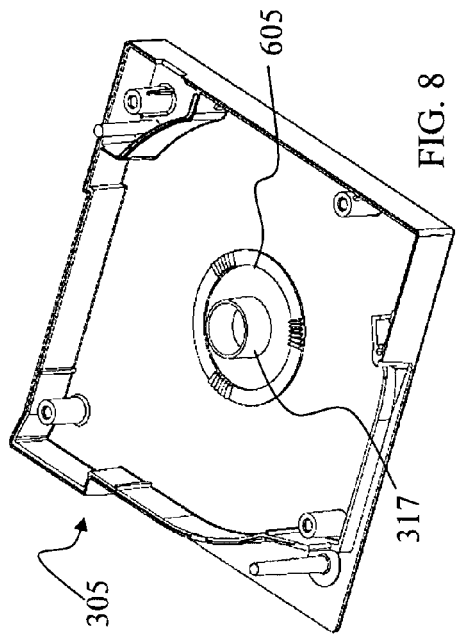
FIG. 8 illustrates a view of a top portion of the storage device.

FIG. 8 illustrates a view of the top portion 305 of the housing 205 of the storage device 200. The tapering boss 317 is illustrated near a center of a bottom surface of the top portion 305. The teeth 605 are formed in the bottom surface of the top cover 305. The teeth 605 are for engaging with the teeth 323 formed on lock component 320. The teeth 605 as illustrated are defined in three regions radially dispersed around an annular protrusion. The teeth 605 may also be formed around an entirety of the annular protrusion. The teeth 605 may also be embedded in the top portion 305 rather than protruding from the bottom surface of the top portion 305. The teeth 605 may be defined to have a variety of widths (for example, the width of the annular portion on which the teeth 605 are defined may vary). Where the teeth are defined may also vary with variations in the design of lock component 320. From these examples further variations would be within the ability of one of ordinary skill in the art.

Figure 9:
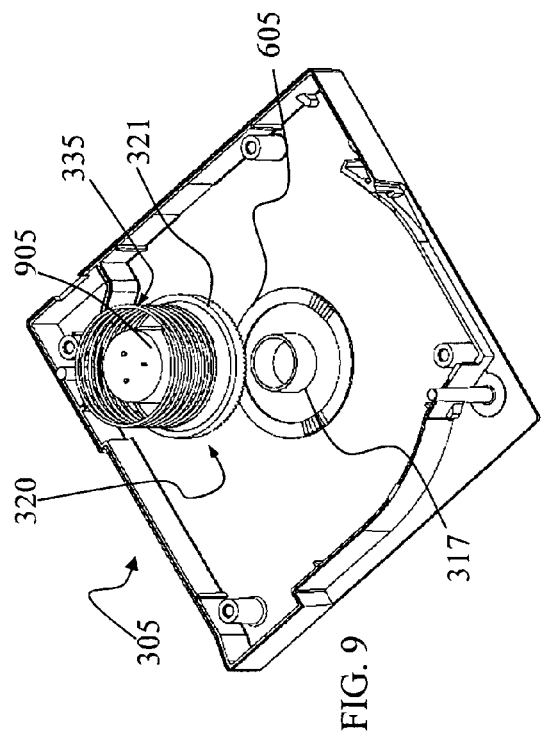
FIG. 9 illustrates a view of the top portion of the storage device with the lock component and a spring.

FIG. 9 illustrates a view of the top portion 305 similar to that of FIG. 8, with the addition of the lock component 320 and the spring 335. FIG. 9 thus illustrates that one end of the spring 335 rests on one surface of the disc like portion 321 of the lock component 320, and that another surface of the disc like portion 321 faces the bottom surface of the top portion 305, on which is defined the tapering boss 317 and the teeth 605.

Figure 10:
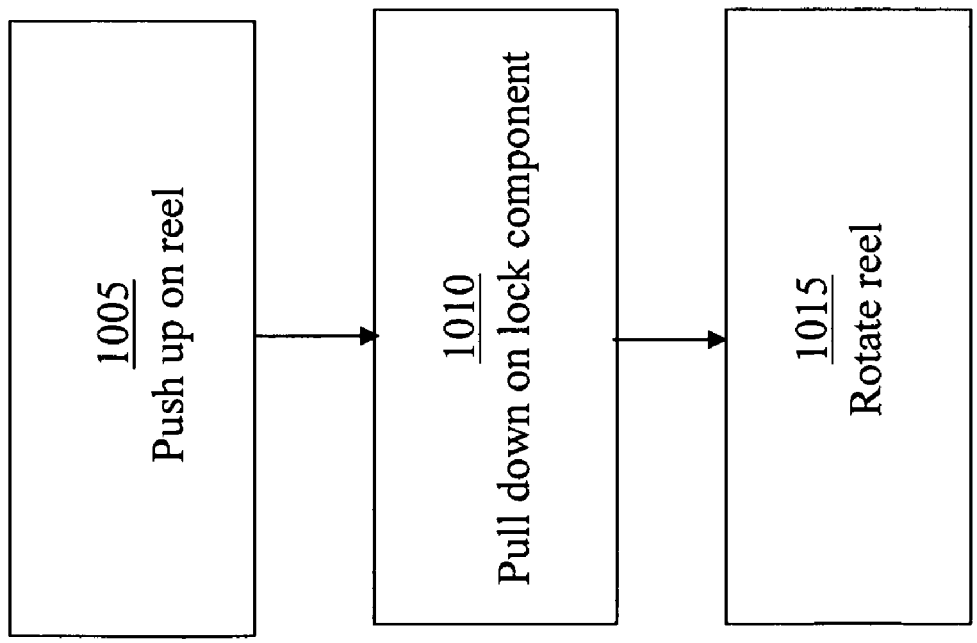
FIG. 10 illustrates method steps for unlocking a reel according to aspects of the present invention.

FIG. 10 illustrates exemplary method steps for reading and/or writing data stored on a storage device according to various examples described above. In step 1005, a reel is pushed up with respect to a bottom portion of a storage device housing. The transition illustrated between FIG. 4 and FIG. 5 illustrates an exemplary pushing according to step 1005 wherein the reel 315 is pushed up from the bottom portion 310. Pushing according to method step 1005 may differ depending on particulars of storage device design. In some storage devices, a reel may not touch an inner surface of a bottom portion of the storage device, and in such storage devices, pushing according to step 1005 may include pushing the reel away from any portion of the storage device which the reel contacts when not in use.

In step 1010, a lock component is pulled down to disengage teeth formed on the lock component from teeth disposed on a surface irrotatable with respect to the lock component. An exemplary step 1010 is illustrated between FIG. 5 and FIG. 6, wherein the lock component 320 is pulled down to disengage the teeth 323 from the teeth 605. Various modifications to step 1010 may be effected based on differences in storage device design, including such differences described with respect to FIGS. 3-9. In step 1015, the reel is rotated such that media disposed on the reel may be accessed for reading and/or writing data to the media. Step 1015 is exemplary for storage devices having a single reel (or more generally, a single rotatable portion). Method steps 1005-1015 may be adapted for storage devices having a plurality of reels, where required for accessing data stored on media disposed on one or more of the plurality of reels.

Various storage device and tape cartridge aspects have been illustrated and described herein. One of ordinary skill in the art would understand that teachings related to each aspect may be adapted to a variety of implementations. Also, it would be understood that certain components have been separately identified herein, but such identification does not imply that such components must be separately formed from other components. Similarly, components identified herein may be subdivided into sub-components in other designs.

Other modifications and variations would also be apparent to those of ordinary skill in the art from the exemplary aspects presented. By example, various exemplary components and systems described herein may be used alone or in combination. Additionally, particular examples have been discussed and how these examples are thought to address certain disadvantages in related art. This discussion is not meant, however, to restrict the various examples to methods and/or systems that actually address or solve those disadvantages.

I claim:

1. A storage device, comprising:
a housing having a top portion and a bottom portion:
a reel for holding data storage media, the reel disposed in the housing between the top portion and the bottom portion, the top portion having an inner surface, and the bottom portion defining a hole through which a bottom part of the reel is accessible; and
a lock component operable to engage the reel to prevent rotation of the reel relative to the lock component, to releasably engage the inner surface, and to disengage from the inner surface in response to a force on the lock component applied in a direction from the lock component towards the bottom portion,
wherein the inner surface is irrotatable with respect to the lock component when the lock component is engaged with the inner surface, and the inner surface is rotatable with respect to the lock component when the lock component is not engaged with the inner surface,
the lock component includes a generally cylindrical portion, the cylindrical portion having an outer surface with one or more protrusions, the reel includes a journal portion having an inner journal surface with one or more notches for interfacing with the one or more protrusions, the relative disposition of the notches and the protrusions providing for the sliding of the cylindrical portion of the lock component along the journal portion, and
the cylindrical portion of the lock component has a hollow interior, the inner surface having an alignment boss formed thereon, the boss protrudes from the inner surface into the hollow interior, and has an outer diameter, the outer diameter generally sized to an inner diameter of the hollow interior proximate the inner surface, and the outer diameter sized smaller more distal the inner surface.

2. The storage device of claim 1, wherein the hollow interior is generally cylindrical, and the outer diameter of the boss tapers from proximate the inner surface to more distal the inner surface.

3. A storage device, comprising:

a housing having a top portion and a bottom portion:

a reel for holding data storage media, the reel disposed in the housing between the top portion and the bottom portion, the top portion having an inner surface, and the bottom portion defining a hole through which a bottom part of the reel is accessible; and a lock component operable to engage the reel to prevent rotation of the reel relative to the lock component, to releasably engage the inner surface, and to disengage from the inner surface in response to a force on the lock component applied in a direction from the lock component towards the bottom portion, wherein the inner surface is irrotatable with respect to the lock component when the lock component is engaged with the inner surface, and the inner surface is rotatable with respect to the lock component when the lock component is not engaged with the inner surface, and the inner surface has an alignment boss formed thereon, the boss protruding from the inner surface generally perpendicularly, and tapering from a larger diameter proximate the inner surface to a smaller diameter more distal the inner surface.

* * * * *